Feb. 22, 1927.

K. N. MATTHEWS 1,618,601

PISTON

Filed Feb. 21, 1924

INVENTOR:
KINCHEN N. MATTHEWS
BY
ATTORNEY

Patented Feb. 22, 1927.

1,618,601

UNITED STATES PATENT OFFICE.

KINCHEN N. MATTHEWS, OF CLEVELAND, OHIO.

PISTON.

Application filed February 21, 1924. Serial No. 694,413.

My invention relates to pistons having removable heads, its object being to prevent rotative displacement of the head and also to prevent undue expansion, injury or breaking of that part of the piston adjacent thereto as a result of expansion of such head.

The said invention consists of means hereinafter fully described and particularly set forth in the claims.

The annexed drawing and the following description set forth in detail certain means embodying my invention; the disclosed means, however, constituting but one of the various mechanical forms in which the principle of the invention may be employed.

Figure 1:
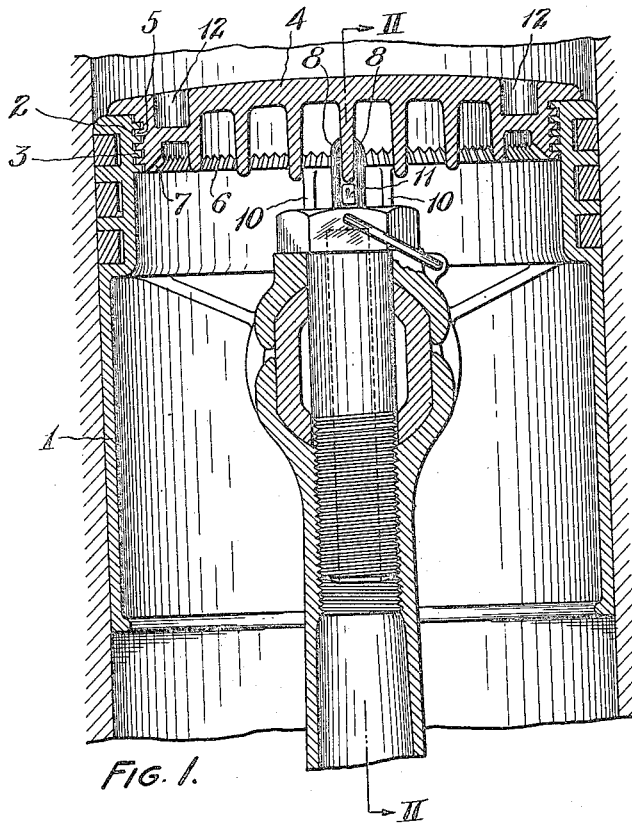
Figure 1 represents an axial section of a piston embodying my invention showing a fragmentary portion of the cylinder and connecting rod.
Figure 2:
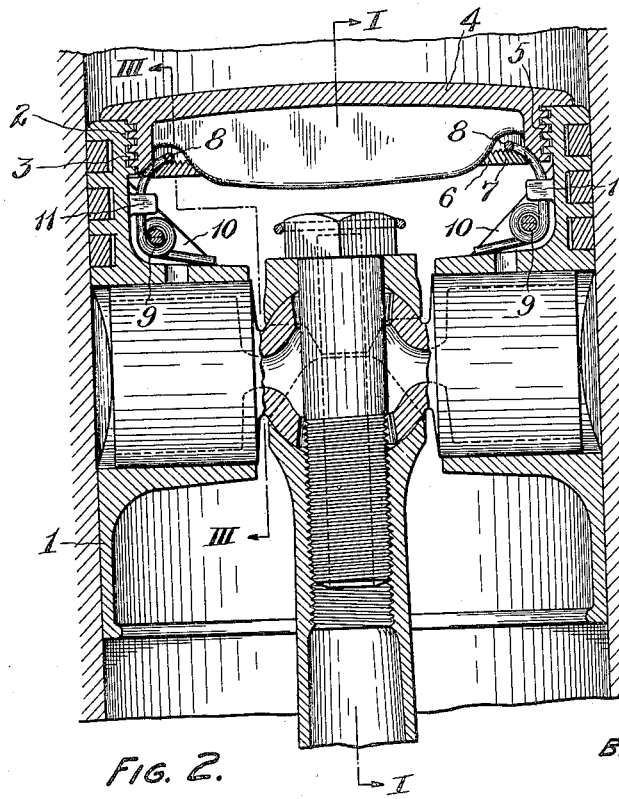
Fig. 2 represents a section taken upon the plane indicated by line II—II, Fig. 1.

In the illustrated embodiment of my invention, the skirt 1 or body portion of the piston is provided with the end opening 2 formed with internal square threads 3. The removable head 4 is provided with the external square threads 5 which engage the threads 3. The outer diameter of threads 5 is, however, made less than the internal diameter of threads 3, Figs. 1 and 2, whereby a given amount of lateral play of the head is permissible, while at the same time the threads make a gas-tight connection. The amount of this play is made such that the outer face surfaces of the threads 5 are not permitted to engage the bottoms of the threads 3 as a result of expansion resulting from the heating of the head when the engine is operated, and due to any normal temperature which may result from such operation.

Figure 4:
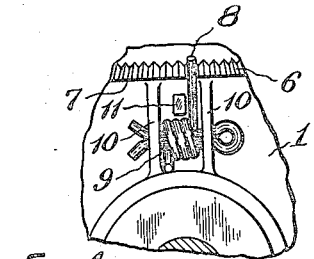
Figs. 4 and 5 are detail elevations of views of modified pawl construction.
Figure 5:
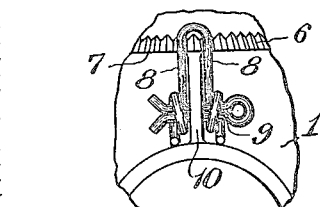
Figure 3:
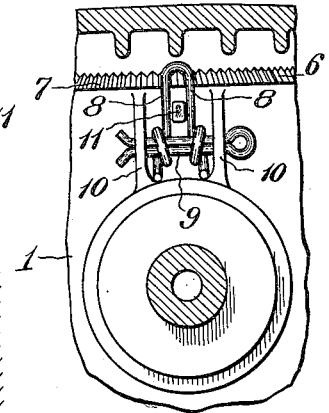
Fig. 3 represents a detail section taken upon the plane indicated by line III—III, Fig. 2, and having one form of pawl which may be used in connection with the locking device.

In order to prevent the rotative displacement of the head, I provide the inner peripheral portion with a circular rack 6 having teeth 7 inclining laterally in both directions, as shown in Figs. 4 and 5. These teeth are engaged by two flexible pawls 8 each mounted upon a cotter-pin 9 which is mounted in two webs 10—10, formed upon the interior of the skirt 1, Fig. 3. This pawl is U-shaped, as shown, and a small lug 11 formed in the skirt projects between the pawl legs and forms a guide for and means for preventing lateral displacement thereof. As shown in said Fig. 3, the two webs 10—10 laterally enclose a pawl.

In Fig. 4, I have shown a modified form of pawl in which but a single leg is provided.

In Fig. 5 I have shown a second modification of the pawl construction in which a single web 10 is used, which projects between the legs of the U-shaped pawl, and thereby performs the function of the lug 11 and also forms a support of the cotter-pin 9.

The engagement of the pawl with the rack is such as will prevent rotative displacement of the head during the operation of the engine, but also is such as will permit such rotation by the application of a spanner wrench, suitable recesses 12 being provided for that purpose.

Figure 6:
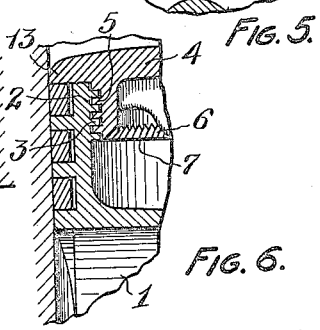
Fig. 6 represents a fragmentary axial section of a modified head construction.

Fig. 6 illustrates a further modification in which I have shown the uppermost piston ring groove intersecting the head end of the skirt whereby the end flange 13 of the head which overlaps the end of the skirt, forms the upper land for such groove. This results in a simplified construction, as will be apparent from an inspection of said Fig. 6, and also provides for taking up wear and ease of adjustment of the upper ring.

What I claim is:

1. A piston comprising the combination with a main cylindrical skirt-member having an opening in its head end; of a head detachably mounted in said opening and making a gas-tight connection; said head being of less diameter than said opening whereby lateral expansion of the head prior to effecting contact between said head and the adjacent longitudinal surfaces of said skirt is permitted.

2. A piston comprising the combination of a main cylindrical skirt-member having an opening in its head end provided with interior square threads; of a head having exterior square threads and having an exterior diameter materially less than the interior diameter of said skirt threads.

3. A piston comprising the combination with a main cylindrical skirt-member having an opening in its head end; of a head detachably mounted in said opening and making gas-tight connection; said head being of less diameter than said opening whereby lateral expansion of the head prior to effecting contact between said head and adjacent longitudinal surfaces of said skirt is permitted; and means for locking said head against rotative movement.

4. A piston comprising the combination of a main cylindrical skirt-member having an opening in its head end provided with interior square threads; of a head having exterior square threads and having an exterior diameter materially less than the interior diameter of said skirt threads and means for locking said head against rotative movement.

5. A piston comprising the combination with a main cylindrical skirt-member having an opening in its head end formed with interior threads; a head adapted to be screwed into said opening and provided with a circular ratchet; and a pawl mounted upon said skirt-member adapted to engage said ratchet.

Signed by me this 6th day of February, 1924.

KINCHEN N. MATTHEWS.